Patented Apr. 25, 1933

1,905,187

UNITED STATES PATENT OFFICE

KNOTT C. RANKIN, OF ROCKLAND, MAINE, ASSIGNOR TO ROCKLAND & ROCKPORT LIME CORPORATION, OF ROCKLAND, MAINE, A CORPORATION OF MAINE

MATERIAL FOR MAKING WATERPROOF MORTAR AND METHOD OF PRODUCING THE SAME

No Drawing. Application filed February 9, 1932. Serial No. 591,925.

In the construction of masonry, as in the case of exterior brick walls, the necessity of a waterproof bonding material or mortar has long been recognized.

Masonry mortars are ordinarily made with Portland cement or with lime, or, as is most generally the case, with a mixture of Portland cement and lime. Cement mortar, although stronger than lime mortar, works hard and is non-plastic and loses its water rapidly, especially with brick or tile, which when dry and porous tend to suck the water out of the mortar. Lime mortar is smooth and plastic, holds its water against the suction of the dry brick work, thereby providing the necessary qualities for a mortar which will easily fill all the joints and crevices of the masonry work in a most satisfactory manner. In practice, therefore, to provide a motar which will have both strength and necessary plasticity, a mixture of Portland cement and lime has generally come to be used.

Mortars made with Portland cement or with lime, or with a mixture of cement and lime as described above, are not waterproof. To the contrary, they are highly absorbent, thereby permitting rain water and moisture easily to penetrate exterior walls exposed to the weather. Such cement mortars have been waterproofed by introducing special waterproof compounds into the mixture, a common type of which forms insoluble lime soaps by reaction with an equivalent amount of calcium oxide in the wet mixture, such as calcium stearate, linoleate, resinate or abietate. There are, however, many disadvantages in the use of such compounds, such as added expense, additional labor costs and the difficulty of obtaining a thoroughly incorporated mixture of a small quantity of waterproofing compound into a large volume of mortar, and last, though not least, the fact that they do not thoroughly retard flow of water into the pores of the dry mortar.

My invention contemplates a quicklime substantially the same in general characteristics and method of use as ordinary quicklimes so that it does not necessitate any unusual knowledge on the part of the artisan who uses it. When this prepared lime has become a part of the dry set mortar or plaster it repels and positively prevents ingress of water.

In this regard my invention is a continuation of that disclosed in my previous application Serial No. 463,367, filed June 23, 1930, which I now more fully discuss and disclose under confirmation of my present experience.

In the practice of my invention and the production of new products and results thereunder, I use a fat or oil of animal or vegetable origin containing glycerides of fatty acid. Animal tallow is found to work extremely well for the purposes desired.

This I melt and spray or atomize into a considerable body of crushed quicklime, while agitating the quicklime in order to get a uniform distribution of the fat throughout the mass while avoiding any such action as grinding as would result in too intimate a mixture or the reduction of the material to a state too fine for effective reaction.

To prepare quicklime for use on a job it must be slaked with an excess of water to a putty or paste. If an intimate mixture of a fat or oil is obtained by very fine pulverization of the quicklime before spraying the fatty material into it, or by grinding the two together, the result is a quicklime which has itself become so water-repellent that the water with which it is mixed cannot penetrate, hence the desired reaction with the water cannot take place.

The novelty of my invention lies partially in my concept that by avoiding a too intimate mixture of oil or fat with the quicklime, proper slaking can take place.

Another novel concept of my invention is confirmed by my discovery that in spite of the fact that a really intimate physical mixture is not attained between oil or fat and quicklime at the outset, the boiling action of the quicklime on slaking with an excess of water has the peculiar effect of spontaneously emulsifying, subdividing and distributing the fatty material to produce a most intimate and thorough commingling of the fatty material with the lime putty. The result, then is the production with substantially no chemical action, of a lime putty throughout whose mass fat or oil is uniformly distributed in a very fine state of subdivision of probably colloidal dimensions. Such extreme dispersion of any oily material is positively essential to thorough water-proofing of any substance.

Heretofore waterproofed cementitious materials, such as Portland cement, have been prepared by the manufacturer with the admixture of dry water-repellent compounds, such as calcium stearate. In order to be effective, such waterproofing compounds must be used in relatively large proportion and must be mechanically mixed with the cement in a most thorough and intimate mixture. In usual practice the cement and the dry waterproofing compound are ground together in a ball mill at the manufacturing plant.

In the practice of my invention, no such intimate mixing or grinding of the various ingredients is necessary. The intimate dispersion of the waterproofing material is accomplished automatically by the action of the hot slaking quicklime and complete waterproofing is obtained with the use of a remarkably small amount of the waterproofing material which I employ.

In practice I have found that a mixture of 100 pounds of quicklime, preferably of high calcium content and three-fourths pound of tallow produces a lime putty with excellent water-repellent characteristics. The quantity of tallow necessary to obtain maximum results depends upon the characteristics of the quicklime used, and upon the grade of tallow. However, the amount of tallow necessary will in no case exceed two pounds for admixture with 100 pounds of quicklime.

In order to get effective and uniform distribution of the fatty material throughout the quicklime mass, the latter should be in a comminuted state as crushed, granular or pulverized, and preferably of such size that all will pass a half inch screen. For the avoidance of too intimate relation of fatty matter and lime, the limit of fineness should be such that, roughly, not more than three-quarters will pass a 100 mesh screen whose opening is 0.0058 inches. It is well known that limes differ widely in their properties and actions which scientists have not been able to adequately explain. However, it is probable that the above is the approximate limit of fineness for all limes although the actual sizing of the lime may best be determined by the knowledge of its properties, such as its calcium content, and other current plant or laboratory data and reports.

As to the theory involved in the spontaneous conversion of the fatty matter by the boiling lime, this, too, falls into a class of phenomena the explanation of which is not universally agreed upon by scientists. It is probable that in the viscosity of the hot fatty matter and/or interfacial tension of the film between fatty matter and hot lime water is to be found the explanation of why a colloidal dispersion of fatty matter is obtained in the mass of lime putty by slaking.

I have found that animal fats work somewhat better than fatty matter of vegetable origin, although satisfactory results can be obtained with the latter. Mineral waxes or oils and animal waxes, such as beeswax or stearic acid refuse to become dispersed and by my process a water-repellent putty or mortar cannot be obtained by their use. Derivatives of animal or vegetable fats, such as stearic acid, and stearin or tri-stearin and oleic acids also fail to give satisfactory results by my process. Materials which can be successfully used by my process may be classified as fatty glycerides of animal or vegetable origin containing only a small percentage of free fatty acid.

Among the fatty glycerides that may be successfully used are peanut oil, peach kernel oil, poppy seed oil, maize oil, soya bean oil, sesame oil, coconut oil, cocoa butter, butter fat, lard, lard oil, tung oil, linseed oil, castor oil, cotton seed oil, cod liver oil, olive oil, and tallow.

As before mentioned, the success of my process depends upon the use of rich fatty matter which will be dispersed into very fine droplets by the slaking action of the lime. The quality which determines the extent of such dispersion is the interfacial tension between the liquid fatty matter and the hot lime water at the temperature of slaking.

Interfacial tension is the resistance to rupture of the film between the two liquids, fatty matter and lime water, and is susceptible to measurement, (conventionally expressed in dynes per square centimeter). The lower the interfacial tension, the more extended will be the film of fatty matter at the time of rupture which results in great dispersion thereof.

The simplest method of determining the suitability of a fatty glyceride for my process is as follows. Place about 2 grams of the fatty matter in a vessel with about 100 grams of crushed quicklime, (making no attempt to mix the two and add 200–250 c. c. of water or sufficient to slake the quicklime to a paste). The ensuing boiling causes melting of the fatty matter (if it be not already liquid) and dispersion throughout the mass.

A portion of the resulting lime paste should be spread in a thin layer and permitted to dry. When dry a drop of water is placed on it and its action observed. If the water is soon drawn into the dried body of paste by capillary action, then the fatty matter has too great an interfacial tension to be properly dispersed by this process and is unsuitable.

If the drop of water remains on the surface unabsorbed, results are considered positive and the fatty matter considered of proper tension. The fatty material to be used therefore should be fatty glycerides of proper tension and by these words I am to be understood as meaning fats or oils which contain glycerides of fatty acids and which when tested according to the procedure above stated indicate predetermined positive water exclusion.

Such a material need not be limited to use for brick mortar. Due to its waterproof qualities it provides a material excellently adapted for exterior plastering or stucco, producing a mortar for stucco which will be impervious to moisture and will not darken or change its color when wet with rain, and due to the exclusion of moisture will prevent any deterioration from the action of frost.

What I therefore claim and desire to secure by Letters Patent is:—

1. A material for making mortar, comprising a mixture of crushed quicklime and matter containing fatty glycerides dispersible by the hot slaking action of the lime, in such proportions that when slaked with an excess of water to a wet paste or putty the heat and boiling of the slaking lime causes the fatty matter to be completely dispersed through and intimately mixed with the wet lime paste or putty in an attenuated state of suspended subdivision in the wet mass to produce when dry a water-repellent mass.

2. A material for making mortar, comprising a mixture of crushed, granular or pulverized quicklime and a fat or oil of animal or vegetable origin in such proportions that when slaked with an excess of water to a wet paste or putty the heat and boiling of the slaking lime causes the fat or oil to be completely dispersed through and intimately mixed with the wet lime paste or putty in an attenuated state of suspended subdivision in the west mass to produce when dry a water-repellent mass.

3. A material for making waterproofed mortar comprising a mixture of quicklime and a fat or oil material of animal or vegetable origin which when slaked by the addition of water in sufficient amount to form a wet lime putty or paste results in the fatty material being completely dispersed through and intimately mixed with the wet lime putty or paste by the heat and boiling of the slaking lime and without grinding or equivalent mechanical mixing of the fatty material and lime.

4. A material as claimed in claim 1 wherein the fatty matter is tallow.

5. A material as claimed in claim 2 wherein the fat or oil is tallow.

6. The method of producing a waterproofed mortar which consists in mixing quicklime and a fatty or oily matter of animal or vegetable origin, containing fatty glycerides dispersible by the hot slaking action of the lime, in slaking the mixture with an excess of water to a wet paste or putty and thereby causing the fatty matter to be completely dispersed through and intimately mixed with the wet lime paste or putty in an attenuated state of suspended subdivision in the wet mass, and in thereafter mixing said paste or putty with the usual proportion of sand to give a waterproofed mortar.

7. The method of producing a waterproofed mortar which consists in mixing quicklime and a fatty or oily matter of animal or vegetable origin containing glycerides of fatty acids having the property of relatively low interfacial tension with hot lime water at the temperature of slaking, in slaking the mixture with an excess of water to a wet paste or putty and thereby causing the fatty matter to be completely dispersed through and intimately mixed with the wet lime paste or putty in an attenuated state of suspended subdivision in the wet mass and in thereafter mixing said paste or putty with the usual proportion of sand to give a water-proofed mortar.

8. In the method of producing a waterproofed material from a mixture of quicklime and a fat or oil of animal or vegetable origin, that step which consists in slaking the lime with sufficient water to form a west paste or putty and thereby causing the fatty material to be completely dispersed through and intimately mixed with the wet lime paste or putty by the heat and boiling of the slaking lime, and without grinding or equivalent mechanical mixing of the fatty material and lime.

9. A mixture for making mortar, comprising crushed quicklime, and a fat or oil of animal or vegetable origin in proportions effective of water repellency in the ultimate mortar and of character dispersible upon the slaking of the quicklime with an excess of water to a wet paste or putty in an attenuated state of suspended subdivision throughout the west mass.

10. A material for making mortar, comprising a mixture of crushed quicklime and matter containing fatty glycerides in the proportions of approximately two percent by weight of fatty matter to one hundred percent by weight of quicklime whereby when the mixture is slaked with an excess of water to form a wet paste or putty the heat and boiling of the slaking lime causes the fatty matter to be completely dispersed through and intimately mixed with the wet lime paste or putty in an attenuated state of suspended subdivision throughout the wet mass.

11. A material as claimed in claim 10, wherein the fatty matter is tallow.

In testimony whereof I affix my signature.

KNOTT C. RANKIN.